United States Patent [19]
Zorn

[11] 3,774,952
[45] Nov. 27, 1973

[54] ALUMINUM BUMPER CONSTRUCTION
[75] Inventor: Edward Zorn, Encino, Calif.
[73] Assignee: Chemplate Corporation, Los Angeles, Calif.
[22] Filed: July 10, 1972
[21] Appl. No.: 270,432

[52] U.S. Cl.............. 293/69 R, 52/188, 280/164 R, 280/500, 293/98, 293/99
[51] Int. Cl......... B60d 1/06, B60r 3/00, B60r 19/04
[58] Field of Search..................... 52/188, 710, 716; 105/369 B, 376; 293/69, 98, 99, 100, 101; 280/164 R, 500; 296/41

[56] References Cited
UNITED STATES PATENTS

| | | | |
|---|---|---|---|
| 1,502,766 | 7/1924 | Curley | 52/710 X |
| 2,797,121 | 6/1957 | Aud | 293/99 |
| 3,212,941 | 10/1965 | O'Brien | 293/98 X |
| 3,427,062 | 2/1969 | Struben | 293/69 R |
| 3,574,379 | 4/1968 | Jordan | 293/98 X |

FOREIGN PATENTS OR APPLICATIONS
| | | | |
|---|---|---|---|
| 274,229 | 7/1927 | Great Britain | 293/98 |

*Primary Examiner*—Robert G. Sheridan
*Assistant Examiner*—Howard Beltran
*Attorney*—I. Morley Drucker

[57] ABSTRACT

A one-piece bumper assembly for attachment to the rear portion of vehicles comprising a generally vertically extending and concavely shaped face sharply curved to merge with a grooved horizontal step, the free edge of said step being formed so as to optionally receive a generally vertical kickplate, a plurality of ribs integrally formed with and extending longitudinally along the length of, the rear of said bumper face, two of said ribs forming a T-shaped longitudinal slot, in and along which bolts are slidably adjustable for attachment to brackets. These brackets extend from the rear frame of the vehicle and the bumper is attached thereto by means of said slidably adjustable bolts. The bumper is thereby readily fastened to the rear frame of the vehicle regardless of the distance of the brackets from each other.

A first aperture is provided substantially in the center of said horizontal step, to accommodate a hitch ball, the threaded stem of which passes through said first aperture. An angularly shaped hitch bracket, having an aperture therein, is securely attached to the underside of the bumper so that the aperture coincides with said first aperture. The hitch bracket is bolted to the underside of the bumper by means of a bolt slidably adjustable in said T-shaped slot.

12 Claims, 6 Drawing Figures

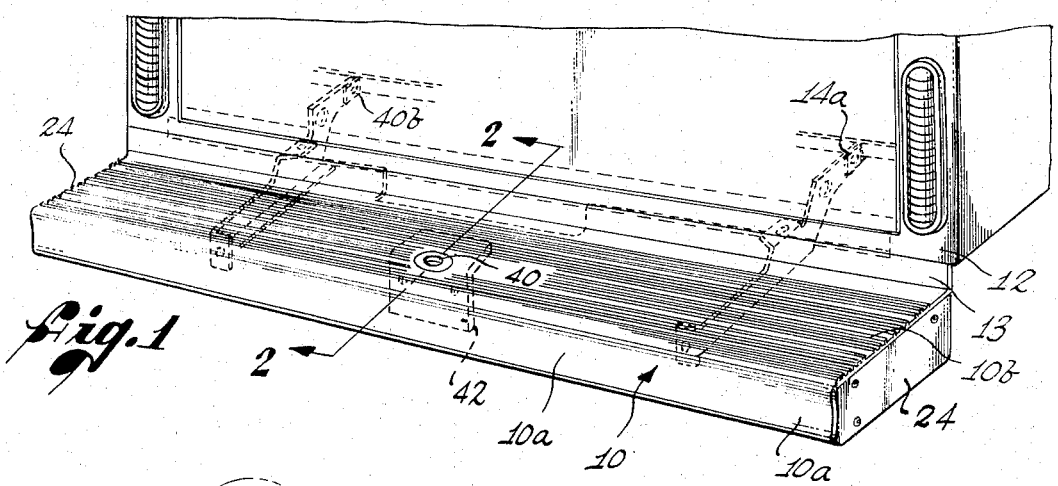
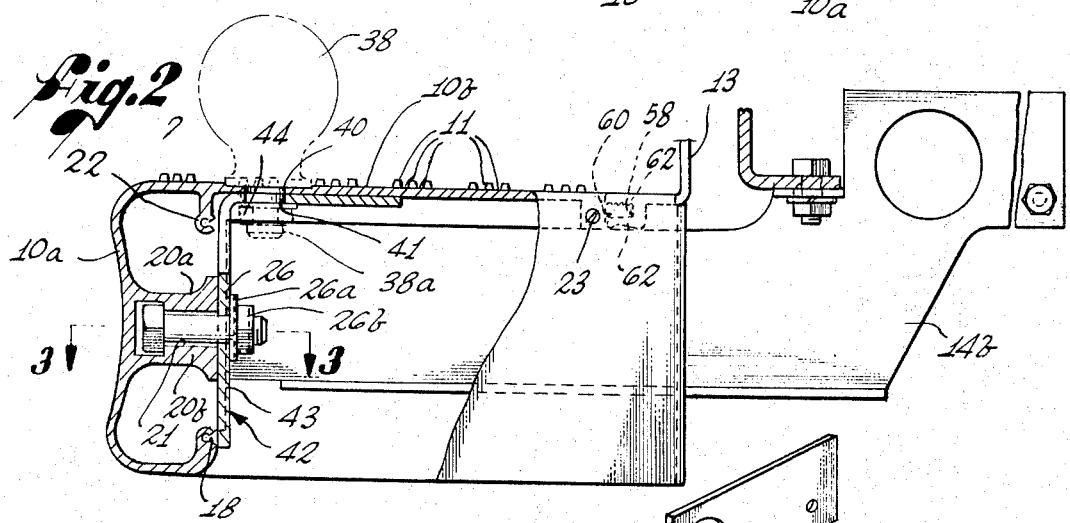
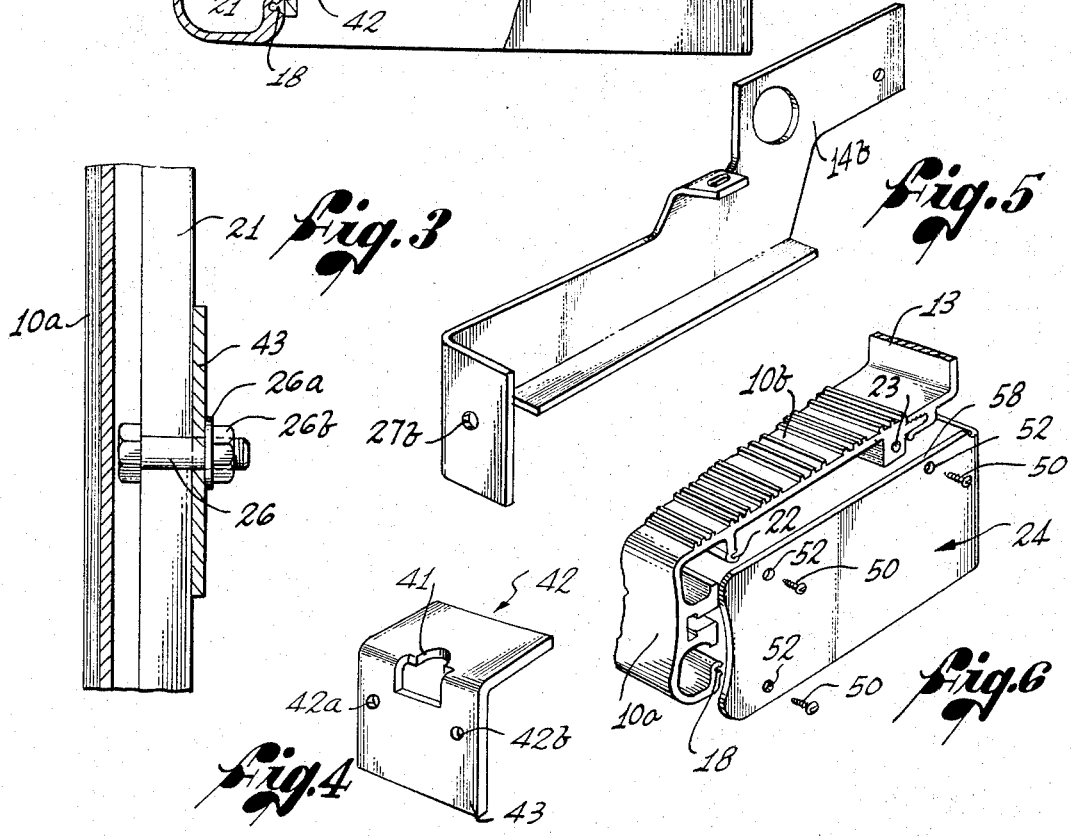

ALUMINUM BUMPER CONSTRUCTION

SUMMARY OF THE INVENTION

Many commercial vehicles such as trucks and vans are furnished with rear bumpers, which do not provide adequate protection in case of collision or impact with another object. The special construction and configuration of the bumper invented by me are superiorly adapted to absorb shocks from such impacts than are the presently known types of bumpers, and may also readily be attached to vehicle already equipped with standard bumpers. My invention furthermore, comprises a combination of a regular rear bumper, a step to facilitate accessibility to the interior of the vehicle, and a hitch ball arrangement adapted to engage with a hitch socket provided on trailers.

The bumper-step combination is preferably extruded in one piece of metal, for example, aluminum. The bumper assembly comprises a generally vertical, but concavely shaped, face. The bumper face extends transversely along the lower rear portion of a vehicle, with the upper edge of the bumper face being sharply radiussed to extend, integrally into a horizontal, grooved, step. The free longitudinal edge of the step is flanged to receive a kick plate, if desired.

Extending along the entire rear of the bumper face are a pair of heavy metal ridges or ribs which ribs together form a T-shaped elongated slot. Bolts are slidably accommodated within said elongated slot, and serve to securely fasten the bumper to brackets extending from the rear frame of the vehicle, regardless of the distance between these frame brackets.

A hole or aperture is provided, substantially in the center of the step portion of the bumper, to accommodate a hitch ball therein. The threaded stem of the hitch ball passes through said centered aperture and an underlying apertured hitch bracket, and is securely attached to the bumper and hitch bracket by means of a nut and bolt arrangement. The hitch bracket is, in addition, affixed to at least one of the nut and bolt combinations, which are slidably adjustable within the T-shaped slot.

The two lateral ends of the bumper are provided with an extrusion slot to allow attachment of end covers thereto, preferably by means of conventional screws.

Thus, the primary object of my invention is to provide a metal bumper assembly, extruded in one piece having a T-shaped bolt slot, the walls of the bolt slot being thickened to provide increased impact resistance, and also enabling the bumper to be attached to the frame brackets, regardless of the point of attachment of those brackets on the vehicle- because the bolt slot slot allows the attaching nut and bolts to be slidably adjusted along the rear face of the bumper until they are aligned with the bracket attach points.

In the event of a collision the concavity of the bumper face minimizes the "riding up" of a vehicle onto the chassis of the vehicle hit while the thickened continuous bolt slot resists buckling to a maximum extent.

The hitch bracket and hitch ball is essentially affixed to the continuous bolt slot, rather than being affixed to the step portion of the bumper assembly — and is thereby held fast, to a maximum extent, in the event of a collision.

Further, because the bumper face extends into a horizontal portion, a step is thereby provided to facilitate access to the vehicle while also serving as a natural spacer between the bumper face and the rear frame of the vehicle.

BRIEF DESCRIPTION OF THE DRAWINGS

FIG. 1 is a perspective view of the bumper construction attached to the rear frame or portion of the vehicle by means of underlying attach or fames brackets (in dotted lines);

FIG. 2 is an enlarged, fragmentary, cross-sectional view of the complete bumper system, taken on line 2—2, of FIG. 1;

FIG. 3 is a partial cross-sectional view of the bumper, taken on line 3—3 of FIG. 2, showing in particular a nut and bolt mounted in the T-shaped slot, holding the hitch bracket to which the hitch ball is attached;

FIG. 4 is a perspective view of the hitch bracket which holds the hitch ball in place;

FIG. 5 is a persepctive view of one of the frame attach brackets, which connects the bumper assembly to the frame of the vehicle; and FIG. 6 is a perspective view of one of the end cover plates which are to be attached to both ends of the bumper assembly.

DETAILED DESCRIPTION OF THE INVENTION

Referring now to the details of the invention as shown in FIG. 1, numeral 10 indicates, generally, the bumper construction or assembly, attached to the rear of a vehicle 12. The face portion 10a of bumper assembly 10 is formed concavely to lessen the probability of, or prevent, the bumper from "riding" above or below a colliding vehicle.

The bumper face 10a is sharply curved, at its upper edge, to merge into a horizontal step 10b. Step 10b facilitates the loading or unloading of the vehicle. The stepping surface of step 10b is provided with a plurality of deep grooves 11, in order to counteract its becoming slippery when covered with water, mud, etc. As noted above, the face 10a and step 10b are made out of one integral piece of metal, preferably extruded aluminum. A so-called kick-plate 13, extruded separately, may be snapped on or slid into the free longitudinal edge of step 10b to provide a splash guard against mud, snow, etc.

The frame attach brackets 14a, 14b and a hitch bracket 42 are mounted underneath the bumper assembly 10. Their specific functions will be explained in detail in connection with FIG. 2.

FIG. 2 illustrates the ribbed interior of the bumper assembly 10, namely ribs 20a, 20b, extending substantially right angularly and inwardly from and along the entire rear of bumper face 10a, and forming a continuous bolt slot 21. Continuous extrusion screw slots 18, 22 and 23 are also formed at the lower and upper edges of the bumper 10, respectively, these screw slots 18, 22, 23 being present so as to attach cover plates 24 to the ends of the bumper 10, as will be later described.

The ribs 20a, 20b are integral parts of the extruded bumper assembly 10, and provide a high strength to weight ratio which cannot be otherwise obtained economically in welded steel or ordinary extruded aluminum bumpers, or those formed of steel for that matter.

Extrusion slots 18, 22, 23 are internally threaded so as to receive screws for the attachment of end cover plates 24 (as seen in FIGS. 1 and 6) to the bumper ends.

The ribs 20a, 20b are undercut, at their rear, so as to form a T-shaped bolt slot 21 in the interior of the bumper assembly. T-slot 21 conforms to and slidably holds the heads of bolts 26, the bolts 26 bolting the bumper assembly 10 to the two frame attach brackets 14a, 14b. The T-shaped bolt slot construction allows the bolts 26 to slide along the slot 21 and to be securely positioned (as by locking nuts) at any location therewithin and thereby be properly aligned with the attach brackets 14a, 14b, which are welded, bolted or otherwise attached to the rear frame of the vehicle. In this way, the problem of mis-alignment of the attach brackets, with respect to fixed bumper attach points, is eliminated.

The bolts 26 in T-slot 21 are aligned with bolt openings 27a, 27b in attach brackets 14a, 14b, respectively and snugly secured to said attack brackets by nuts 26b and washers 26a. (See FIGS. 1, 2 and 5).

The attach brackets 14a, 14b are securely fastened to the vehicle's frame by welded or bolting, as mentioned. It will be understood that the exact shape of the attach brackets 14a, 14b may vary considerably. The brackets 14a, 14b here illustrated are but one of many types.

In actual assembly, the bumper 10 is first centered with respect to the vehicle 12. Four bolts 26 are carried in T-slot 21 along with their associated lock washers 26a and nuts 26b. The two outside bolts 26, and their locking means 26a, 26b are loosened and slid along T-slot 21 to a point of alignment with bolt openings 27a, 27b of the brackets 14a, 14b and the bumper 10 is securely affixed to the brackets upon tightening their associated locking washers 26a and locking nuts 26b. The thickened walls 20a, 20b of the T-slot 21 will inhibit buckling upon impact by a normal passenger vehicle.

The hitch ball is then attached in the following manner. A conventional type of hitch ball 38 (for attachment to a hitch socket of, for example, a traler) with a threaded stem 38a is aligned with the hole 40 provided in the center portion of the bumper step 10b. The stem 38a then is passed through an opening 41 in an apertured angular hitch bracket 42 (shown in FIG. 4, as well as in FIGS. 1 and 2). The hitch bracket 42 is attached to the hitch ball 38 by means of a locking nut 44 screwed tightly onto stem 38a.

The vertically depending section 43 of hitch bracket 42 is provided with two holes 42a, 42b, which, once the hitch ball 38 has been mounted in the hole 40, align themselves with the T-shaped slot 21. Two inner bolts of the four bolts 26 mounted slidably within slot 21 are then readily aligned with, and pass through said hitch bracket holes 42a, 42b to firmly bolt the hitch bracket 42 to the bumper 10 by means of locking means 26a, 26b.

The hitch ball 38 is thus completely attached to the bumper assembly 10 by virtue of two bolts 26 and locking nut 44. The bending load induced by the towing load on the hitch ball 38 is transmitted from the step 14b to the T-shaped slot 21 by means of the angled hitch bracket 42 where the greatest strength of the bumper section lies. The hitch bracket 42 is preferably made of steel to efficiently transmit the loads.

FIG. 3 illustrates the bolting of hitch bracket 42 by means of a nutted bolt 26, 26a, 26b mounted slidably in the T-shaped slot 21 formed by the ribs 20a, 20b.

FIG. 6 is an enlarged view of an end cover plate 24, to be attached to one end of the bumper assembly 10.

A similar end cover plate (not shown) is attached to the other end of the bumper assembly 10. The cover plates 24 are affixed to the bumper assembly 10 by means of screws 50 passing through appropriate holes 52 in the end plates 24 and into internally extruded screw slots 18, 22 and 23. The cover plates 24 may have "cut-out" sections provided therein, if desired.

An aluminum kickplate 13 may press-fitted onto the inner free edge 58 of the bumper step 10b, if desired. A generally horizontal channel 60 is formed in the lower edge of the kickplate 13, which channel is of slightly less thickness than the inner free edge 58 of step 10b. The walls 62 of the channel 60 cam be spread slightly, and are forced onto the edge 58 of step 10b to securely hold the kickplate 13 in place. The kickplate also functions as a splash guard and cover plate.

As it appears from the foregoing description, the bumper assembly, according to my invention may easily be mounted on the rear frame of a vehicle. The hitch ball, if not used may, of course, be dismounted separately, while the remaining bumper assembly is maintained intact on the rear portion of the vehicle. Grooves 11 are formed in step 10b and provide traction when step 10b is covered with water, snow or mud.

While the foregoing has illustrated and described what is now contemplated to be the best mode of carrying out the invention, the construction is, of course, subject to modifications without departing from the spirit and scope of the invention. The invention is therefore, intended to cover all modifications that may fall within the scope of the appended claims.

I claim:

1. In a one-piece metal bumper assembly having a generally vertically extending bumper face merging into a generally horizontal portion, the improvement which comprises:
   an integrally formed fastener slot, extending substantially along the rear of said bumper face,
   a plurality of fasteners retained against axial withdrawal within said fastener slot, and being slidably adjustable therealong to a desired position, and
   locking meanfor said fasteners, said bumper assembly being adapted to be readily affixed to brackets by means of said slidably adjustable fasteners and locking means for said fasteners.

2. The metal bumper assembly of claim 1 wherein said fastener slot is T-shaped, in cross-section.

3. The metal bumper assembly of claim 1 wherein said horizontal portion is of sufficient width to provide a step for said bumper assembly.

4. The metal bumper assembly of claim 1 wherein said fastener slot is T-shaped, in cross section and said fasteners are headed bolts.

5. The metal bumper assembly of claim 4 wherein said horizontal portion is grooved along a majority of its length.

6. The metal bumper assembly of claim 1 wherein said fastener slot is formed by a pair of walls which are of substantial thickness to provide substantial bukling resistance to impact.

7. The metal bumper assembly of claim 1 wherein a hitch ball is affixed to said bumper.

8. The metal bumper assembly of claim 1 whrein a hitch ball is affixed to said bumper by means of a metal hitch bracket and said hitch bracket is fixedly mounted to said fastener slot of said bumper face by means of a plurality of said fasteners whereby the towing load exerted on said hitch bracket is transmitted to said fastener slot.

9. The metal bumper assembly of claim 8 wherein said metal of said bumper assembly is extruded aluminum and the metal of said hitch bracket is steel.

10. The metal bumper assembly of claim 1 wherein end cover plates are secured to the ends of said bumper assembly.

11. The metal bumper assembly of claim 1 wherein said bumper face is generally concave.

12. A one piece extruded aluminum bumper assembly, for attachment to a vehicle frame, which comprises:

a bumper having a generally vertically extending face, the upper edge of which merges into a generally horizontal grooved step portion;

an integrally formed T-shaped slot formed on the rear of said bumper face, and extending substantially along the entire rear of said bumper face, said slot being formed by thickened aluminum walls;

a plurality of headed bolts housed within said T-shaped slot, said bolts being slidably adjustable within said T-shaped slot to a desired position;

locking means for each of said bolts, said bumper assembly being adapted to be readily affixed to brackets on said vehilce frame by means of said slidably adjustable bolts and said locking means therefor.

* * * * *